Jan. 23, 1962 A. H. HAMBRECHT ET AL 3,017,698
AIR FILTER WITH INTEGRAL FRAME
Filed March 25, 1958 4 Sheets-Sheet 1
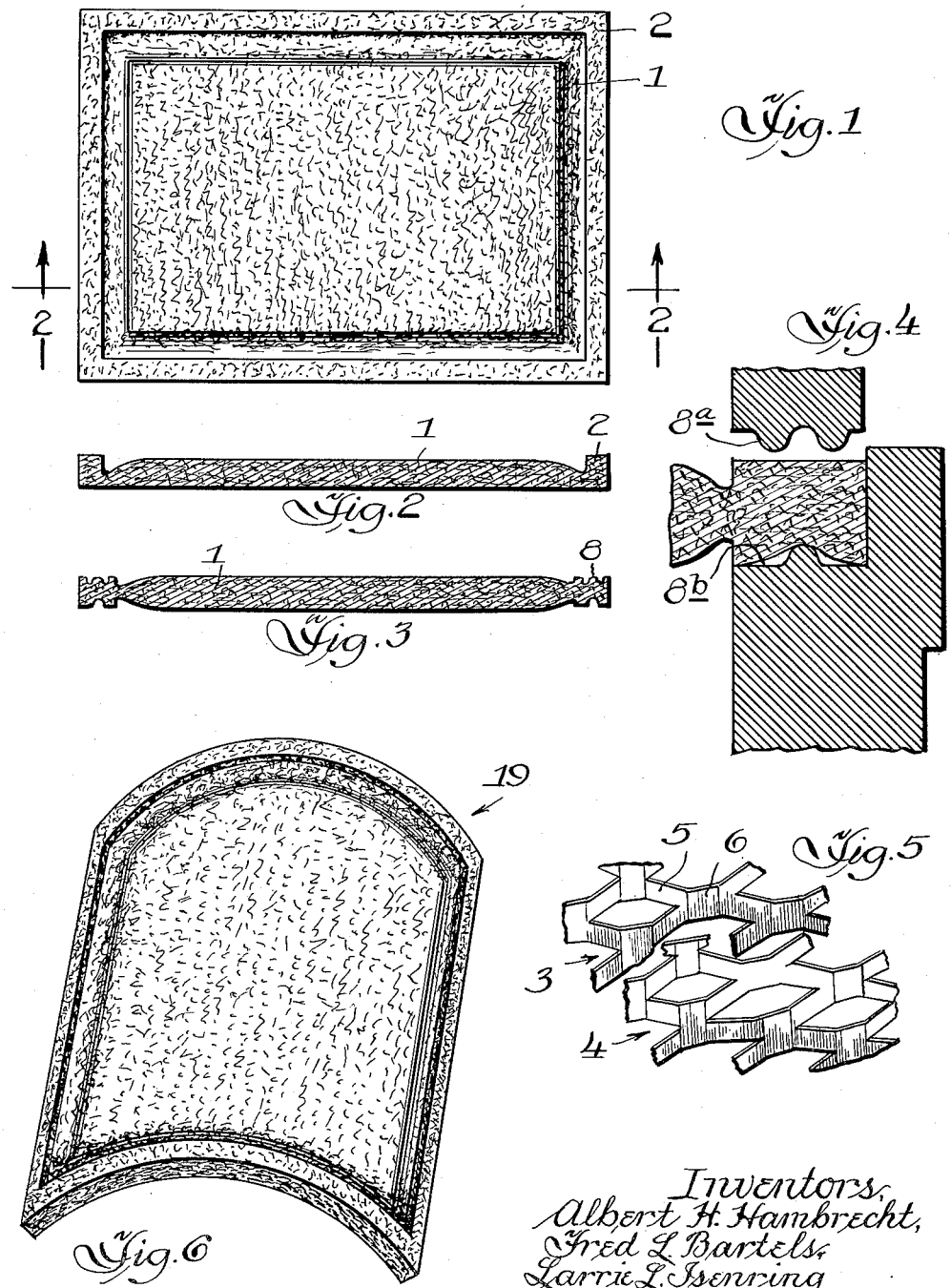
Inventors,
Albert H. Hambrecht,
Fred L. Bartels,
Larrie L. Isenring
and Earl B. Rowe,
By: Jones, Darbo & Robertson, Attys.

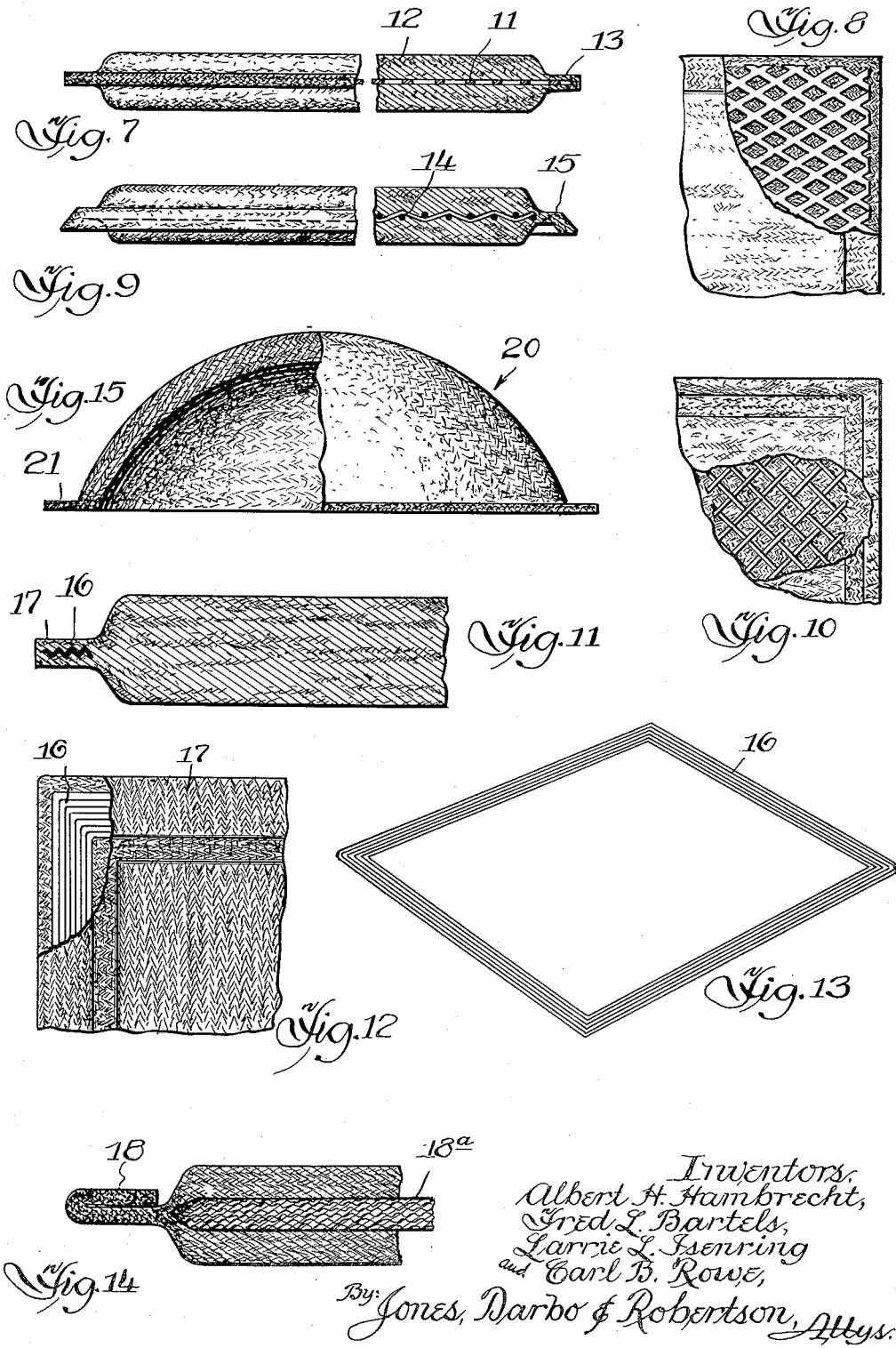

Jan. 23, 1962   A. H. HAMBRECHT ET AL   3,017,698
AIR FILTER WITH INTEGRAL FRAME
Filed March 25, 1958   4 Sheets-Sheet 3
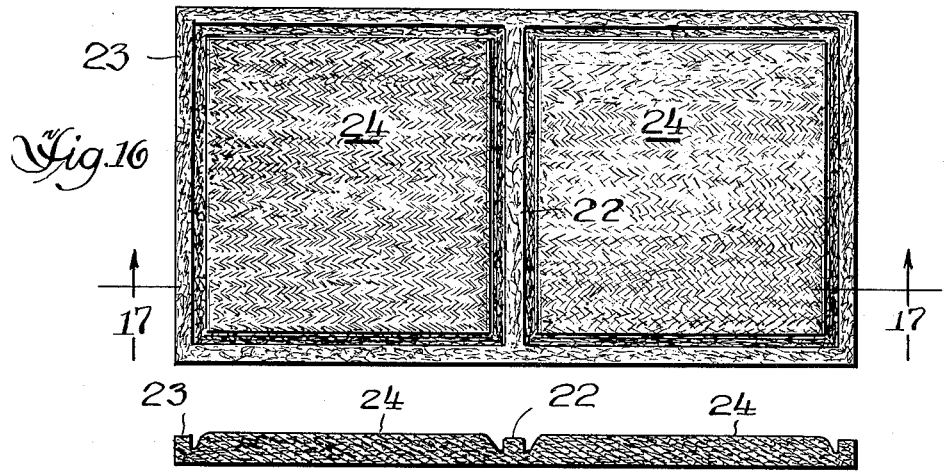
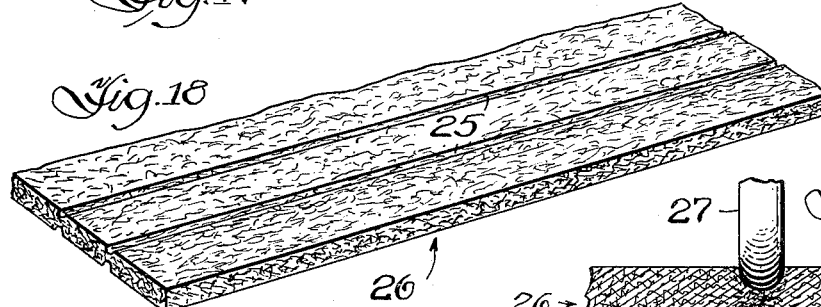
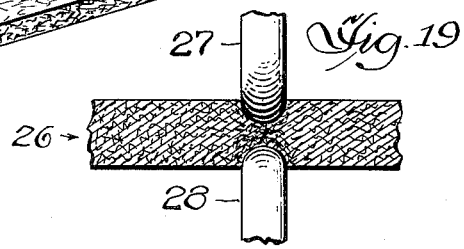
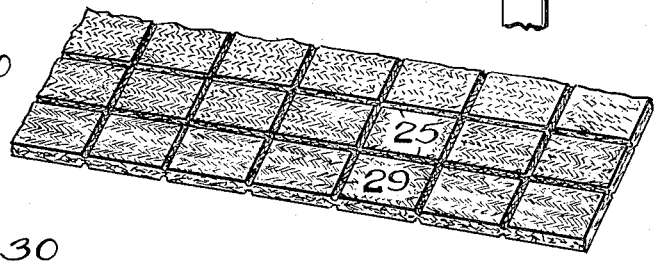
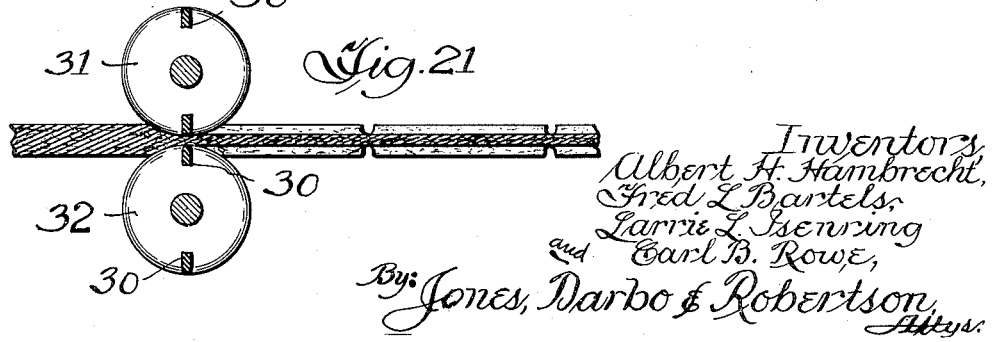

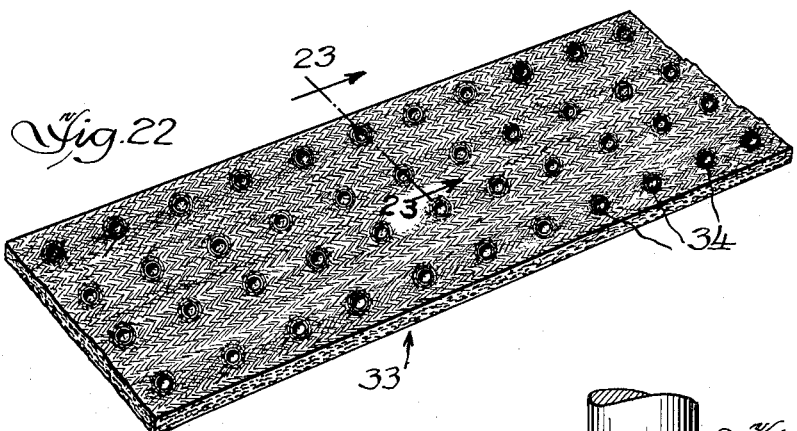
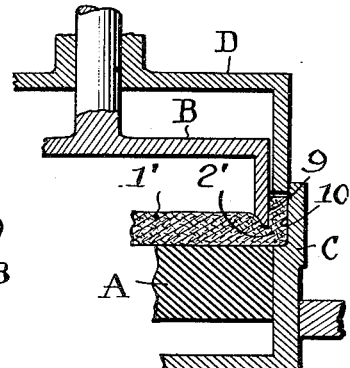
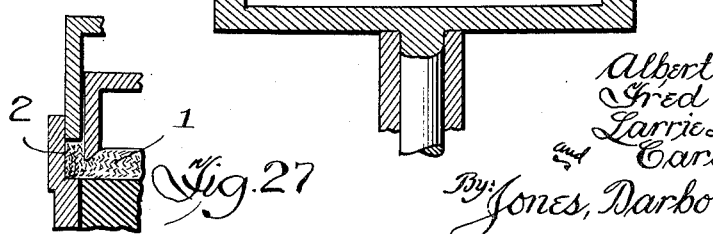

United States Patent Office 3,017,698
Patented Jan. 23, 1962

3,017,698
AIR FILTER WITH INTEGRAL FRAME
Albert H. Hambrecht, Fred L. Bartels, Larrie L. Isenring, and Carl B. Rowe, all of Madison, Wis., assignors to Research Products Corporation, Madison, Wis., a corporation of Wisconsin
Filed Mar. 25, 1958, Ser. No. 723,897
2 Claims. (Cl. 29—552)

This invention relates to air filters in which the filtering media is composed essentially of malleable metal such as, for example, expanded aluminum foil, and pertains particularly to the problem of suitably supporting the media and providing the necessary strength in the filter unit.

To simplify the description of the invention, it is pointed out at the outset that it is applicable to filtering media of metals other than expanded aluminum foil, such as expanded copper foil, wire or wire-like strands of reasonably malleable metal felted, knitted or otherwise formed into a filtering body, but the invention will be described particularly with reference to expanded aluminum foil since this material is eminently suited to the most advantageous use in carrying out the invention. The metal is malleable and the several layers of expanded foil used in building up the body of a filter unit or blanket of filtering media are continuous so that when anchored along their edges at the edges of the unit, they hold the individual integral elements of each layer together in the filter body. Irrespective of the particular metal of which the media is composed, the body of the filter through which the air or other gas is intended to be passed for filtering purposes is an interstitial mass which traps entrained particles by either straining action or as a result of impingement of the particles upon adhesive-coated surfaces of what is known as an impingement type filter.

Air filters made from materials with which this invention is concerned are generally formed into pads or panels which in themselves are more or less pliant and fragile and must be specially protected and supported to withstand damage that might otherwise result from handling during assembly of the filtering unit, shipment, insertion into holding frames or filter cells, cleaning and replacing, vibration, air flow pressure and other forces to which the filter unit may be subjected. It is especially important that the so-called "permanent" type of filter be ruggedly constructed to withstand repeated cycles of use, including installation, removal, cleaning, reinstallation, etc.

The general practice has heretofore been to provide separate frames of stiff metal or cardboard for such media and to otherwise protect it, as by means of wire grids or perforated or expanded sheet metal. A typical filtering unit of this type is shown in Patent No. 2,754,-928, dated July 17, 1956, for Gas Filter. A filter formed from expanded aluminum foil or similar malleable material is also shown in the pending application of Fred L. Bartels et al., Serial No. 374,971, filed August 18, 1953, entitled: Interstitial Body Suitable for Use as a Filter, now Patent No. 2,829,733. In this instance, however, the filtering media is itself crushed together or partially compacted to interengage the individual filter elements and thus form a coherent body sufficiently strong or stiff to be relatively self-sustaining. An improvement in such filtering media directed toward the similar objective of rendering it self-supporting is described in the pending application of Ragner E. Onstad et al., Serial No. 630,591, filed December 26, 1956, entitled: Filter and Method of Making the Same. While the filters made in accordance with the invention described hereinafter may or may not incorporate the inventions of these pending applications, this invention is directed to the independent concept of selectively compressing limited portions of the media pad to form a frame, or supporting or reinforcing elements, as distinguished from compacting the filtering body itself to provide, in effect, stiff, almost solid supporting elements for the filter unit.

The general object of the invention is to provide a better filter from media of the type above described, improvements residing in such important considerations as reduced cost, more accurate dimensioning, narrower frames with proportionately larger filtering areas, and, generally, rugged construction assuring long useful life without damage or impaired efficiency. More specifically stated, an object of the invention is to provide a filter having frames, reinforcing ribs, or other structural supporting means which are integral with the filtering body. These objectives are achieved by taking advantage of the inherent malleability of the material of which the filtering media is composed to form the structural supporting elements by rather severely compressing the media at selected locations, the supporting elements approaching, in properties and function, solid metal frames or other filter body supporting elements. In addition to this fundamental concept, the invention contemplates the combined use of compression of the malleable material and a bonding agent serving the purpose of enhancing the stiffness of the compressed elements by preventing relative movement of contiguous surfaces within the bodies of the elements themselves.

As used herein, the term "malleable" refers to the susceptibility of metals to be fashioned or formed by the application of a compressive force to a mass of the material.

The invention is fully described and representative examples of the manner in which the invention may be carried out in the production of filter products are given in the following description, taken in conjunction with the accompanying drawings, in which—

FIGURE 1 is a plan view of an air filter of the panel type having an integral frame in accordance with the invention;

FIGURE 2 is a cross-sectional view of the filter unit of FIG. 1, taken at the line 2—2 thereof;

FIGURE 3 is a cross-sectional view similar to that of FIG. 2 and showing a modified form of integral frame therefor;

FIGURE 4 is a detailed, sectional view suggesting the manner in which the frame of the unit of FIG. 3 may be formed;

FIGURE 5 is a fragmentary view showing two layers of expanded aluminum or copper foil, the preferred material for the filter medium used in carrying out the invention;

FIGURE 6 is a perspective view of a semi-cylindrically formed filter unit having the integral frame of the invention;

FIGURE 7 is a side view, partially in section, of a modified form of filter unit incorporating an internal stiffening grid;

FIGURE 8 is a detail view, partly in section, showing a portion of the unit of FIG. 7;

FIGURE 9 is a further modified form of filter unit exemplifying the use of an alternative form of stiffening means;

FIGURE 10 is a detail view, partly in section, showing a portion of the filter unit of FIG. 9;

FIGURE 11 is a partial, sectional view illustrating the use of supplemental frame-stiffening means;

FIGURE 12 is a detail view, partly in section, showing a corner portion of the filter unit of FIG. 11;

FIGURE 13 is a perspective view of the internal stiffening frame used in the unit of FIG. 11;

FIGURE 14 is a partial view, in cross-section, illustrating an alternative form of the invention;

FIGURE 15 is a side view, partly in section, of a dome-shaped filter having an integral frame exemplifying a special pre-formed unit;

FIGURE 16 is a plan view illustrating a filter unit having a median reinforcing rib;

FIGURE 17 is a cross-sectional view of the filter of FIG. 16, taken at the line 17—17 thereof;

FIGURE 18 is a perspective view of a portion of a blanket of filtering media wherein the several layers of which the blanket is composed are held together by means of the invention;

FIGURE 19 is a detail view, in section, showing the manner in which the blanket of FIG. 18 is fabricated;

FIGURE 20 is a perspective view of a portion of a blanket of filtering media similar to that illustrated in FIG. 18 but having additional mechanical binding means;

FIGURE 21 is a cross-sectional view showing more or less diagrammatically the manner in which the blanket of FIG. 20 is fabricated;

FIGURE 22 is a perspective view of a length of filtering blanket illustrating an alternative method of holding the blanket together by means of the invention;

FIGURE 23 is a cross-sectional view taken at the line 23—23 of FIG. 22;

FIGURE 24 is a detail view, in section, showing the manner in which the blanket of FIG. 22 is fabricated;

FIGURE 25 is a sectional view showing, somewhat diagrammatically, a die set for forming the filter unit of FIG. 1; and, FIGURES 26 and 27 are partial views of the die set of FIG. 25 illustrating the sequence of operations thereof.

The filter unit illustrated in FIGS. 1 and 2 is a rectangular panel consisting of a body 1 of interstitial filtering media and an integral peripheral frame 2. This simple filtering unit may advantageously be composed of the desired number of layers of expanded aluminum foil, such as layers 3 and 4 illustrated in the detail view of FIG. 5, to provide a filter of the desired thickness. The filtering body 1 is designed to permit the flow of air or other gas therethrough while retaining any liquid or solid particles entrained therewith. Although the individual baffle elements, such as 5 and 6 (FIG. 5) are held together by inter-attachment since each individual layer of expanded foil is formed from a continuous sheet of foil, the built-up body of filtering media, as well as the individual layers, has little lateral stiffness and, unless bonded or otherwise held together by means hereinafter adverted to, the several expanded foil layers are not attached to each other.

The integral frame 2 serves to hold the several layers of the filter unit together and also to provide necessary structural stiffness for dimensional stability and to give sufficient strength to the unit as a whole to withstand damage due to handling in transportation and use. As is indicated in FIG. 2, the frame 2 is formed from the expanded aluminum foil of which the entire filter unit is composed, by gathering and compressing the marginal portion of the unit to greatly increase the apparent density to approach, in effect and depending upon the compressive force used, a solid metal peripheral frame. The resulting structure is stiff and in every way a satisfactory and durable filter unit.

The filter of FIGS. 1 and 2 may be formed by means, for example, of the die set illustrated in FIG. 25. This die set, illustrated somewhat diagrammatically, includes a stationary part A, suitably supported upon a table A', and movable parts B, C and D, the movable parts being arranged to move up and down with respect to the stationary part A. To make the filter unit having a filtering media surface equal to the surface 7 of Part A, a stack or pad 1' of expanded aluminum foil sheets having width and length dimensions greater than the corresponding outside dimensions of the finished filter unit, as indicated in FIG. 25, is placed upon part A, as shown. Part B is then moved down to clamp the pad 1' firmly to the stationary part A after which part C is moved up, the positions of the parts then being as shown in FIG. 26. It will be seen that the marginal portion 2' of the filter pad has been turned upwardly between surfaces 9 and 10 of parts B and C, respectively. Part D is then forced down to compress the marginal portion of the pad 2', thus confined between surfaces 9 and 10, to form filter frame 2 as a peripheral support for filtering area 1.

The filter unit thus formed may be additionally stiffened, and the several layers comprising the filtering media bonded together, by means of a bonding agent in the manner described in the above-identified pending application of Ragnar E. Onstad, et al. A lacquer solution, or other settable bonding composition of the type described in the said application may be applied to the body 1, the frame 2, or to the entire unit including the body and frame. This binding agent may be applied either after fabrication of the unit has been completed, as above described, or, with proper choice of bonding compositions, the bonding material may be applied either to the individual layers of expanded foil prior to stacking to form the pad 1' or to the pad itself, prior to the filter unit fabrication process. When applied prior to the mechanical fabrication of the unit, a thermoplastic bonding agent may, for example, be used, and the finished filter unit warmed following fabrication sufficiently to soften or melt the bonding composition after which the unit is permitted to cool and the composition thereby caused to re-set.

It has been found that while compression of the malleable material of the filtering media results in a relatively stiff structure, the rigidity of the unit will be further enhanced by bonding the structure together, as described.

Other means may be employed for the purpose of further stiffening the integral filter frames. Such means may be employed in addition to, or in place of, the use of a bonding agent. For example, the frame may be corrugated, as shown at 8 in FIG. 3. The curved surfaces of the corrugations contribute to the stiffness of the structure. These corrugations may be formed concurrently with the compression of the marginal portions of a filter pad by suitably shaping die surfaces 8a and 8b, as is indicated in FIG. 4.

In the form of filter unit illustrated in FIGS. 7 and 8, an internal stiffening grid 11 is incorporated in the body of the filter and extends into the frame portion 13. Any suitable stiff structural element may be employed for this purpose, expanded flat sheet metal being illustrated. The unit is made by stacking one-half of the desired number of layers of expanded foil and placing thereon the stiffening grid 11, after which the other half of the layers of foil are stacked upon the grid to complete the pad. The marginal portions of the pad are then compressed to form the frame 13 and securely incorporate the marginal portions of the stiffening grid 11 therein by compression of the foil into the openings in the grid. The filter unit thus formed is thus stiffened from edge to edge to supplement the stiffening effect of compression of the marginal portion of the pad to form the frame 13.

A somewhat modified filter structure is illustrated in FIGS. 9 and 10. In this unit, a stiffening grid 14, illustrated as hardware cloth by way of a further example of a suitable stiffening material, extends only approximately to the frame 15 of the filter. The stiffening grid 14 is inserted in the body of the stack of layers of the expanded foil as the pad to form the filter is being assembled, as above described, and the unit is then mechanically bound together at its periphery and the frame formed by compression of the marginal portion of the pad. In this instance, the frame itself is flanged, as shown, to increase its stiffness.

In the filter of FIGS. 7 and 8, the stiffening element extends through the filtering body and into the frames and in the filter illustrated in FIGS. 9 and 10 the stiffening element is limited to the filtering body, stopping short of the frame. Another possible and useful construction is to supplement the stiffness of the compressed integral frame by embedding therein a stiffening core which does not extend across body of the filter. Such a structure is illustrated in FIGS. 11 to 13. A frame 16 of stiff sheet metal, preferably corrugated as shown, is embedded within the filter frame 17 by compression of the marginal portion of the stack forming the filter pad with frame 16 properly located at the median position therein.

A simple method for approximately doubling the stiffness of frame attainable by compression of the ungathered marginal portion of a pad of interstitial filtering media of malleable material is illustrated in FIG. 14. In this modification of the invention, the compressed marginal portion 18 of the pad is turned back upon itself to form a double thickness of compressed material. This example of the invention also illustrates use of the integral frame concept for making a filter with a composite media. A filler 18a, which may be any desired filtering material is sandwiched between outer layers of the filter unit, being held in this embedded position by the compressed, coherent frame 18. Outer layers of the filter body may serve a significant filtering function as well as retain the auxiliary filtering media in the unit.

Utilization of the marginal portion of the filter pad to form an integral frame offers the possibility of economically forming the filter unit into a wide variety of special shapes and sizes. The filter unit 19 illustrated in FIG. 6 is semi-cylindrical in form and may be initially fabricated in this shape or may be so formed after manufacture of a planar unit, such as that shown in FIG. 1. A convenient method of manufacture of the semi-cylindrically shaped filter is to apply a suitable bonding agent to the filter of FIG. 1 and thereafter form and hold the unit in shape until after the bonding agent has set.

Although it is not feasible to illustrate the many possible forms that special filter units may take when manufactured in accordance with the invention herein described, another example will serve to suggest additional possibilities. The filter element 20 shown in FIG. 15 is dome-shaped and is provided with an integral compressed frame 21 adapted to be clamped, for example, between the flanges of a duct or conduit or clamped by means of a suitable clamping ring to an air intake fitting. The interstitial filtering media contemplated by the invention is generally sufficiently stretchable to be readily formable into the dome-shaped unit 20.

In addition to the formation of stiff supporting peripheral frames for filter units, reinforcing ribs may also be incorporated to give stiffness to the filtering bodies between the edge frames. Such a structure is illustrated in FIGS. 16 and 17. In this unit, reinforcing rib 22 is provided intermediate the shorter sides of the filter frame 23, leaving filtering areas 24 for the passage of air. Desirably, the reinforcing rib 22 is formed in the pad of stacked layers of expanded aluminum foil by first gathering the pad together along the line of the intended reinforcing rib to furnish the additional metal desirable to give sufficient density and therefore strength to the rib, and thereafter comprising the gathered material by means of suitable tools. After the reinforcing rib has been formed in the pad, the frame 23 may be formed in the manner above described with reference to the filter of FIG. 1.

Any necessary number of reinforcing ribs may be so formed in a filter unit and, because of the great compressibility of the expanded foil media, crossing ribs may be provided if desired.

In addition to framing and reinforcing, the technique of the invention may be employed for the purpose of mechanically fastening together the several layers of stacked expanded foil as a much cheaper substitute for the present practice of stitching and as an alternative to bonding by means of a bonding agent or as a temporary expedient for holding the pad together while processing. A portion of a blanket of filtering media 26 so fastened together is illustrated in FIG. 18. The several individual layers of expanded aluminum foil or other material of which the blanket is composed, are crushed together and interengaged along spaced parallel lines or runs 25. The integral fastening means thus forming the fabricated blanket may be continuously and very inexpensively formed by passing the blanket stack between opposed wheels 27 and 28 (FIGURE 19). A series of such sets of wheels spaced apart an appropriate distance on a common shaft continuously forms the spaced runs 25. After the several layers are thus fastened together to form the blanket, the latter may be sheared into desired length or the blanket may be rolled for storage or shipment.

The blanket of filtering material illustrated in FIG. 20 is similar to that shown in FIG. 18 except that cross runs 29 are provided in addition to the longitudinal runs 25. The cross runs may be formed by the same wheels that form the longitudinal runs, cross bars 30 being carried by the wheels 31 and 32, as shown in FIG. 21.

Another form of blanket is shown in FIGS. 22 and 23. Instead of binding the several layers of expanded foil together along spaced rows, the blanket 33 is quilted by compressing it together at spaced spots 24, as by means of punches 34 (FIG. 24). The foil is held together securely at these spots and the blanket thus produced may be rolled for use or shipment.

It will be appreciated that the fundamental inventive concept herein disclosed may be adapted and applied in many different ways in the production of highly useful filter products, the particular forms herein shown and described being only examples of typical embodiments of the invention. It will be understood that structural features shown and described with reference to a particular product may be used, if desired, in combination with structural features of other products in the arranging of any of a large number of combinations for optimum physical and operational characteristics for particular applications. In view of the wide variety of forms that the invention may assume, it is stressed that the invention is not intended to be limited except by the scope of the appended claims.

Invention is claimed as follows:

1. The method of making an air filter unit which method comprises assembling a pad of fabricated interstitial malleable metal, gathering said pad together at selected locations to bring between opposite surface unit areas more material than was between them before the gathering, and compressing said pad so gathered at said locations throughout the thickness thereof to form coherent structural parts of substantially greater apparent density than the balance of said pad.

2. The method of forming a frame for an air filter of expanded malleable metal foil which method comprises assembling a pad of said metal foil, gathering the marginal portions thereof together to bring between opposite surface unit areas more material than was between them before the gathering, and thereafter compressing said marginal portions so gathered together throughout the thickness thereof to permanently deform said metal foil and thus form a dense, stiff peripheral frame.

References Cited in the file of this patent

UNITED STATES PATENTS

| | | |
|---|---|---|
| 1,396,767 | McGee et al. | Nov. 15, 1921 |
| 1,509,674 | Koehler | Sept. 23, 1924 |
| 1,820,259 | Wandel | Aug. 25, 1931 |
| 1,897,976 | Birkholz | Feb. 14, 1933 |
| 2,020,668 | Wandel | Nov. 12, 1935 |
| 2,106,246 | Fourness | Jan. 25, 1938 |
| 2,230,154 | Anderson et al. | Jan. 28, 1941 |

(Other references on following page)

UNITED STATES PATENTS

| | | |
|---|---|---|
| 2,262,455 | Goodloe | Nov. 11, 1941 |
| 2,334,263 | Hartwell | Nov. 16, 1943 |
| 2,382,560 | Goodloe | Aug. 14, 1945 |
| 2,521,985 | Lang et al. | Sept. 12, 1950 |
| 2,572,150 | Hood et al. | Oct. 23, 1951 |
| 2,579,984 | Trowbridge | Dec. 25, 1951 |
| 2,672,214 | Goodloe | Mar. 16, 1954 |
| 2,755,079 | York et al. | July 17, 1956 |
| 2,825,912 | Sawtell et al. | Mar. 11, 1958 |
| 2,829,733 | Bartels et al. | Apr. 8, 1958 |
| 2,860,740 | Holland et al. | Nov. 18, 1958 |
| 2,964,441 | Goldstone | Dec. 13, 1960 |